US012796601B2

(12) United States Patent
Leenknegt et al.

(10) Patent No.: US 12,796,601 B2
(45) Date of Patent: Nov. 17, 2026

(54) AGRICULTURAL RESIDUE DEPOSITING APPARATUS AND METHOD

(71) Applicant: CNH Industrial America LLC, New Holland, PA (US)

(72) Inventors: Arno Leenknegt, Hooglede (BE); Bart M. A. Missotten, Herent (BE); Dré W. J. Jongmans, AG Klundert (NL); Frederik Tallir, Esen (BE); Lucas Deruyter, Gits (BE); Thomas Mahieu, Vleteren (BE)

(73) Assignee: CNH Industrial America LLC, New Holland, PA (US)

( * ) Notice: Subject to any disclaimer, the term of this patent is extended or adjusted under 35 U.S.C. 154(b) by 658 days.

(21) Appl. No.: 18/094,435

(22) Filed: Jan. 9, 2023

(65) Prior Publication Data

US 2023/0225246 A1 Jul. 20, 2023

(30) Foreign Application Priority Data

Jan. 14, 2022 (EP) .................................... 22151575

(51) Int. Cl.

*A01D 41/127* (2006.01)
*A01D 41/12* (2006.01)
*G06T 11/00* (2026.01)

(52) U.S. Cl.

CPC ....... *A01D 41/127* (2013.01); *A01D 41/1243* (2013.01); *G06T 11/00* (2013.01)

(58) Field of Classification Search

CPC .. A01D 41/127; A01D 41/1243; A01D 41/12; A01D 75/00; G06T 11/00; A01F 12/40
See application file for complete search history.

(56) References Cited

U.S. PATENT DOCUMENTS 8,463,510 B2 * 6/2013 Knapp ................. A01D 41/127 701/50
10,470,366 B2 11/2019 Mahieu et al.
(Continued)

FOREIGN PATENT DOCUMENTS

DE 102014005904 A1 10/2015
DE 102014014049 A1 3/2016
(Continued)

OTHER PUBLICATIONS

"John Deere Announces Performance Enhancements to MY20 S700 Series Combines", Deere news release, May 29, 2019, https://www.deere.com/en/our-company/news-and-announcements/new . . . , downloaded from the internet May 17, 2021, 4 pages.
(Continued)

*Primary Examiner* — Anne Marie Antonucci
*Assistant Examiner* — Nicholas Patrick Langhorne
(74) *Attorney, Agent, or Firm* — Buchanan Ingersoll & Rooney PC

(57) ABSTRACT

An agricultural residue depositing apparatus includes a human-controllable mobile vehicle that is capable of generating agricultural residue and depositing it on a ground surface over which the mobile vehicle is moveable. The vehicle includes an interface device that is capable of generating one or more output that is interpretable by a human operator. The apparatus include sensors of agricultural residue deposited by the mobile vehicle and processors to which the sensors are operatively connected. The processors are additionally operatively connected to the interface device such that the interface device generates one or more outputs, based on one or more signals generated by the one or more sensors, of or relating to agricultural residue deposited by the mobile vehicle. The processors are capable of adding human-interpretable augmentation to the outputs
(Continued)

indicating one or more parameters of or relating to the deposition of residue.

22 Claims, 7 Drawing Sheets

(56) References Cited

U.S. PATENT DOCUMENTS

| | | | | |
|---|---|---|---|---|
| 10,820,478 | B1 * | 11/2020 | Ferrari | A01B 79/005 |
| 2005/0194473 | A1 | 9/2005 | Pearson et al. | |
| 2006/0189362 | A1 | 8/2006 | Niermann et al. | |
| 2012/0123650 | A1 | 5/2012 | Diekhans et al. | |
| 2015/0089912 | A1 | 4/2015 | Patton et al. | |
| 2015/0351321 | A1 | 12/2015 | Shane | |
| 2018/0092302 | A1 | 4/2018 | Vandike et al. | |
| 2018/0338422 | A1 * | 11/2018 | Brubaker | A01D 41/1208 |
| 2019/0350132 | A1 * | 11/2019 | Issac | A01D 41/1243 |
| 2020/0060092 | A1 | 2/2020 | Baumgarten et al. | |
| 2020/0120869 | A1 | 4/2020 | Vandike et al. | |
| 2021/0015039 | A1 * | 1/2021 | Vandike | G06T 7/0002 |
| 2021/0034867 | A1 | 2/2021 | Ferrari et al. | |
| 2021/0127573 | A1 | 5/2021 | Mahieu et al. | |
| 2021/0400870 | A1 * | 12/2021 | Sunil | G01N 33/0098 |
| 2022/0369553 | A1 * | 11/2022 | Christiansen | G06T 7/0004 |
| 2022/0394923 | A1 * | 12/2022 | Christiansen | A01D 41/127 |
| 2024/0008389 | A1 * | 1/2024 | Anderson, Jr. | G06V 20/56 |
| 2024/0196793 | A1 * | 6/2024 | Christiansen | A01D 41/1243 |

FOREIGN PATENT DOCUMENTS

| | | | |
|---|---|---|---|
| EP | 1408732 | A1 | 4/2004 |
| EP | 2936961 | A1 | 10/2015 |
| EP | 2936962 | A1 | 10/2015 |
| EP | 3145289 | A1 | 3/2017 |
| EP | 3145290 | A1 | 3/2017 |
| EP | 3571918 | A1 | 11/2019 |
| EP | 3618604 | A1 | 3/2020 |
| WO | 2014105930 | A1 | 7/2014 |

OTHER PUBLICATIONS

Extended European Search Report for European Application No. 22 151 575.2, dated Jun. 24, 2022, 7 pages.

* cited by examiner

AGRICULTURAL RESIDUE DEPOSITING APPARATUS AND METHOD

CROSS REFERENCE TO RELATED APPLICATION

This application claims priority to European Application No. 22151575.2, filed Jan. 14, 2022, the content of such application being incorporated by reference herein in its entirety.

FIELD OF THE INVENTION

The invention relates to agricultural residue depositing apparatus and a related method of using such apparatus.

BACKGROUND OF THE INVENTION

Various kinds of harvesting machine have been introduced into agriculture over the past century. In use many of these generate residue products, chiefly constituted by plant parts, as by-products of harvesting processes. Nearly all crop plants include parts such as stems, straw, seed pods or leaves that cannot directly be used as food for humans or animals, or fuel products; and/or are of low value such that extensive processing or transporting of them is not economically justified. Such unusable plant parts become agricultural field residue during harvesting operations. Field residue in some cases may include additional or other components such as grit, gravel or stones, and/or weeds. Field residue is also called agricultural residue or crop residue. These terms are used synonymously herein. For the avoidance of doubt, field residue as referred to herein does not include products such as manure or slurry that while typically spread behind a moving machine do not result from harvesting processes.

Field residue resulting from harvesting (especially of various cereal plants) typically is not removed from the field in which it is created. Historically it was commonplace either to burn such residue in the field, or plough it into the soil after harvesting in order to improve the soil nutrient content for subsequently cultivated plants. Nowadays however it is recognised that field residue can also be useful for other purposes if it is correctly spread on the ground surface of a field. Modern harvesting machines commonly include sub-systems the aim of which is to treat and distribute the residues in a desired manner.

Such purposes include slowing the drying of soil through evaporation of water by placing an even layer of residue on the soil surface; and the prevention or slowing of soil erosion. Residue spreading if carried out correctly moreover can inhibit or slow down the germination of weed plants in the period between harvesting and re-seeding of a field.

Furthermore it is known for the residues of some harvested plants (canola being an example) to produce phytotoxic compounds during decomposition. Such compounds can inhibit the germination of subsequently planted crops. Careful spreading of the residue can prevent, control or at least reduce the toxic compound production.

For reasons such as the foregoing it is frequently desired to introduce as much precision as possible into the deposition of agricultural residue resulting from harvesting operations. In the majority of cases it is desired to spread an even areal density of residue behind a moving harvesting machine such as a combine harvester using a sub-system referred to as a spreader. However in some situations it may be desired to spread e.g. varying depths of residue in order to achieve particular effects.

Field residue often is pre-treated within the harvesting machine. An example of such pre-treatment is the chopping of plant parts to predetermined sizes using a cutting sub-system forming part of the harvesting machine. Such chopping is often desirable e.g. when the residue is constituted by or contains a considerable amount of straw. Long lengths of straw are inconvenient to handle as residue and may not produce the desired effects, especially when it is required to cover the soil surface of a field in order to prevent erosion or dehydration. Furthermore, chopping of residue prevents the process of degradation of the residue from taking longer than a desired time; and ensures that the components of a residue batch are all of approximately the same size.

Following chopping however, or more pronouncedly when chopping is not carried out, the ballistic properties of field residue are not well suited to distribution behind a harvesting machine in a manner achieving even spreading (or another spreading cross-section such as a centrally heaped line). The trajectories of residue parts may be unpredictable owing to their lightness and shapes. Moreover the residue components typically are a mixture of chopped straw and chaff meaning the ballistic properties are not consistent throughout the residue. This is in contrast to for example fertiliser and seed pellets the (typically spherical) shapes and uniformity of which mean they nearly always are spread in a predictable manner when dispensed from a moving machine.

Winds can adversely affect the ability of a harvesting machine to spread field residues in a desired, e.g. even (in particular with respect to areal density) manner. Winds can be very variable due to localised meteorological circumstances and/or can also be influenced by the presence/absence of nearby fixed objects, such as bushes, trees, buildings, etc, and/or mobile objects, such as other harvesters, tractors towing trailers, etc. Winds, in particular cross-winds, can through the effect of aerodynamic drag on the residue particles lead to extensive parts of a field not receiving any residue during spreading; and other parts receiving an excess of residue. Also the variations in the aerodynamic performance of the different parts of a residue mix can mean that the concentrations of different components of the residue may be inconsistent as a result of wind influence.

Slopes in fields also can cause uneven spreading of residue; and a sloping field may be more prone to the influence of wind than a more sheltered location.

The characteristics of the residue often vary over time and location, for example because during a harvesting operation the characteristics of the crop plants, from which the residue is formed, also vary; or because of changes in the weather and/or soil condition. Hence during the course of a harvesting session for instance the density and moisture content of the residue may vary. The settings of a harvesting machine may be adjusted during harvesting in order to maximise the harvesting of valuable crop parts in light of such changes and this may introduce further variability into the residue make-up, making it hard to achieve desired spreading results.

The operational parameters of the spreader may be adjustable. In some harvesting machines this can only be achieved by manually re-setting adjustable parts while the machine is inactive; but some more expensive machines such as certain combine harvesters include actuator systems that permit adjustment of the spreader by way of commands input by an operator using cab-mounted controls. Adjustable parameters of the residue treatment process can include, for example, the length to which residue parts are chopped; the angle at which residue is ejected from the spreader onto the ground; and the speed/energy of ejection.

Furthermore it can be strongly desirable to limit the extent of distribution of field residue during harvesting operations. This may be important e.g. at the boundaries of fields beyond which it is not acceptable for residues to spread. Also it generally is desirable to ensure that during depositing the residues do not spread into regions of uncut crop This can be to avoid overloading of the intake sections of a harvesting machine when harvesting crop that is mixed with residues from a previous harvesting pass; and to ensure that the quality of the harvested crop is not adversely affected by residue contamination.

Hence there is a general need for accuracy in the containment of residue distribution; and winds can make it additionally hard to ensure the spread of residues over desired zones of the field surface.

Various attempts have been made to automate the process of residue spreading as a solution to the problems summarised above.

US 2020/0060092 A, which is incorporated by reference, discloses a combine harvester including a chaff cutter and an adjustable produce distributing arrangement for distributing residue at the rear of the machine. The combine harvester includes a driver assistance system that optimises control of the produce distributing arrangement using at least one sub-strategy comprising throw direction correction and/or inclination-dependent produce distribution and/or produce distribution in a longitudinal direction and/or produce distribution in a transverse direction, with respect to at least one optimisation criterion.

US 2005/0194473 A, which is incorporated by reference, discloses a work vehicle having a fluent material spreader comprising two counter-rotating variable speed impellers that receive and broadcast fluent material such as field residue. A right-side impeller broadcasts out to a right-side material broadcast width, and left-side impeller broadcasts out to a left-side material broadcast width. The rotational speed of the right-side impeller is commanded to achieve a desired a right-side material broadcast width, and the rotational speed of the left-side impeller is commanded to achieve a desired a left-side material broadcast width. Command of the right-side and left-side impellers is achieved either manually by an operator, or automatically by a control system based on sensor input.

EP 1408732 A, which is incorporated by reference, discloses a distributing device for chopped products that are discharged from a harvester, comprising a guiding device for setting the ejection direction of the chopped products, a motor for adjusting the ejection direction of the guiding device, and a control device that is linked with a side detection unit for detecting the position of a harvested part and/or of a not yet harvested part of a field relative to the harvester. Signals of the detection unit are taken into consideration in the control of the motor. The side detection device is linked with a position establishing device and with a memory device in which information about the field to be harvested is stored. The side detection device identifies the position of the harvested part and/or of the not yet harvested part of the field by way of the position of the harvester and the information stored in the memory device.

EP 3145289 A, which is incorporated by reference, discloses an agricultural combine harvester comprising a residue spreading system that is steerable to influence distribution of residue, wherein the combine harvester includes a sensor for emitting a wave signal through the residue during spreading. The sensor measures reflections of the signal from a first zone of the residue and from a second zone of the residue. The spreading system is steered based on the reflections. The wave signal has a wavelength that is greater than 0.001 mm and less than 50 mm.

EP 2936961 A and EP 2936962 A each of which is incorporated by reference, and disclose a vehicle having a receiving device for harvested material and a distribution device for distributing a spreading material separated from the harvested material in the form of a spreading material strip behind the moving vehicle. The distribution device can be controlled to adjust a parameter of the distribution of material, such as the position of the strip transversely relative to the direction of travel; a detection means is provided for detecting the distribution of the crop over the width of the receiving device; and a control unit determines the position of the strip on the basis of the detected distribution.

DE 102014005904 A, which is incorporated by reference, discloses a vehicle having steerable wheels and a distribution device for ejecting grit in the form of a flow centred around a central ejection direction. A control unit varies the mean ejection direction as a function of the steering angle of the wheels.

DE 102014014049 A, which is incorporated by reference, discloses an agricultural vehicle having a pick-up device for picking up crop from a field area, a processing section in which grit is separated from the crop, and a distribution device for ejecting a stream of grit in alternating throwing directions onto the field area. A sensor at the outlet of the distribution device detects the density and speed of the grit jet. A processing unit models a distribution of the grit on the field surface resulting from the measured density and speed, and controls operating parameters of the distribution device on the basis of the modelled distribution of the grit.

EP 3618604 A, which is incorporated by reference, discloses one or more tangible, non-transitory, machine-readable media including instructions that cause a processor to receive a signal indicative of a residue coverage on a surface of an agricultural field from a sensor positioned behind a harvester system relative to a direction of travel. The instructions also cause the processor to determine the residue coverage on the surface of the agricultural field based on the signal, and the residue coverage includes a percentage of the agricultural field that is covered by residue. The instructions cause the processor to control a residue control system based on the residue coverage.

EP 3145290 A, which is incorporated by reference, discloses an agricultural harvester comprising a sensor for measuring a position of an object near the harvester. The sensor is connected to a processor for defining at least two different danger zones respectively corresponding to at least two different sets of harvester driving parameter values. The processor can determine actual harvester driving parameter values, and the processor can compare the actual harvester driving parameter values with the different sets to select a matching set and to select a corresponding one of the danger zones. The processor outputs a warning signal if the position is in the corresponding danger zone. The apparatus of EP 3145290 A is operable when the harvester is in a residue spreading mode.

All of the foregoing prior art approaches to residue distribution either seek to automate the adjustment of distribution equipment in full or, in the case of US 2005/0194473 A, which is incorporated by reference, include an option for visually monitoring the broadcast width and adjusting the rotational speed of the impeller(s) in an attempt to optimise spreading characteristics.

Full automation of the process of optimising residue spreading as proposed hitherto is potentially unsuccessful because the operators of combine harvesters tend to lack faith in the accuracy and/or reliability of such arrangements. Hence the fully automated approaches to residue distribution adjustment may be unpopular, under-utilised or over-ridden if provided.

Systems relying on operator inspection of distributed residue before distribution adjustments are made are likely to be distinctly sub-optimal for a variety of reasons.

Firstly it is generally the case that rearward visibility from the cab of a harvesting machine is either poor or non-existent. The cabs typically have only forwardly and sideways-facing windows because a large grain tank, or another bulky part of the machine, usually lies immediately behind the location of the cab. This means that operators nearly always are reliant on rear-view mirrors or rear-view cameras in order to inspect the area behind the machine. Both these means provide only a limited field of view that in the case of mirrors usually omits the area immediately behind the machine at which residue is spread onto the ground. Also the mirrors, and some cameras, have no ability to enhance resolution, enlarge or shrink the visible image or readily change the field of view.

Moreover when a harvesting machine operates in dry field conditions typically it generates a large cloud of dust that is particularly dense at the rear of the vehicle and often is opaque. This renders mirrors and cameras intended to provide an image of the area behind the harvesting machine practically useless much of the time. As a result it often is not possible for an operator to inspect the distribution of field residue deposited behind the machine until some time after spreading activity is complete.

This drawback means that residue spreading control systems requiring visual cross-checking of the spreading operation in some cases are of little or no benefit. This can be the case even when automated systems are provided since the inability of an operator to check, in real time, the effectiveness of the distribution action means that faith in such systems is likely to remain poor.

SUMMARY OF THE INVENTION

According to the disclosure hereof in a first aspect there is provided agricultural residue depositing apparatus comprising a mobile harvesting machine that is capable of generating agricultural residue and depositing it on a ground surface over which the mobile harvesting machine is moveable, the mobile harvesting machine including an interface device that is capable of generating one or more output that is interpretable by a human operator; the apparatus including one or more sensors of agricultural residue deposited or being deposited by the mobile harvesting machine and one or more processors to which the one or more sensors are operatively connected, the one or more processors additionally being operatively connected to the interface device such that the interface device generates one or more outputs, based on one or more signals generated by the one or more sensors, of or relating to agricultural residue deposited by the mobile harvesting machine; and the one or more processors being capable of adding human-interpretable augmentation to one or more said outputs indicating one or more parameters of or relating to the deposition of residue.

Apparatus as defined above promotes a mode of operation during residue spreading in which the interface device produces an output such as but not limited to a real-time camera image, a mimic display, a simulation or a hybrid of two or more such indications of the residue as it is undergoing spreading, or immediately following spreading, behind the mobile harvesting machine, together with augmentation such as but not limited to one or more lines, symbols, numbers and/or words that are visible using the interface device and indicate for instance one or more boundary of a line of spread residue, a deposition profile or cross-section of the residue, an indicator of the effect of wind on the residue, a target harvesting machine or sub-system setting or a range of other parameters.

The operator of a mobile harvesting machine as aforesaid may then as desired adjust one or more variables of the residue spreading operation (such as but not limited to those mentioned herein, i.e. the degree of processing of the residue before it is spread; the energy and/or velocity of ejection of the residue, the angle or direction of spreading of the residue and so on; and/or other factors such as the speed and/or the direction of travel of the mobile harvesting machine) in order to optimise the residue spreading operation in accordance with one or more criteria.

To this end for example the interface device may be capable of providing advice to the operator of the mobile harvesting machine on adjustments that may be required in order to achieve optimal spreading. As one non-limiting example the interface device may display a message such as "Increase vehicle speed to 10 km/h in order to maintain desired maximum spreading depth". Another example may be a message relating to the direction of travel required in order to minimise the effect of a cross-wind. However it is not essential that the outputs of the interface device are verbal as described; and they may as suggested above take the form of lines and/or symbols that do not have a literary meaning.

Combinations of words and symbols are possible within the scope of the disclosure. Coloured indications as explained herein also are possible, and may be combined with other forms of augmentation of the output of the interface as described herein.

Additionally or alternatively the apparatus may be employed in conjunction with automated adjustment features of the kinds referred to above. In such a case confidence on the part of machinery operators in the automated adjustment features may be improved by reason of the augmentation providing additional verification, over and above what an operator may witness directly, of residue spreading performance; and a range of additional parameters, such as but not limited to e.g. a target residue swath width and/or the regions spread with residue, may be automatically adjusted in dependence on the outputs of the apparatus. Use of the apparatus of the invention may be of particular benefit when as described a dust cloud largely or entirely prevents verification by eye of the spreading uniformity and coverage.

As disclosed but not explicitly claimed herein the mobile harvesting machine is or includes a ground-supported, mobile harvesting machine, and in particular may be a combine harvester, green bean harvester, green pea harvester or in some instances a beet/potato harvester.

Preferably the interface device is or includes a visual display that is visible to a human operator and that displays one or more images or other indicia of or relating to agricultural residue deposited by the mobile harvesting machine.

The term "interface device" is to be interpreted broadly herein, and relates to any device that is capable of conveying information about the residue spreading operation to a human operator. It is not necessary that the interface device is in addition capable of receiving inputs from the operator, although this is likely to be desirable. Hence the interface device may take the form of e.g. a touch screen or a display screen that is associated with an input device such as a keyboard or keypad.

Conveniently the one or more images may include one or more images of or representing the mobile harvesting machine, the one or more images being variable in dependence on one or more variable parameters of or pertaining to the mobile harvesting machine. As a non-limiting example of a variable parameter of this kind one may consider the width (or one or more other parameters) of a header fitted to the mobile harvesting machine. The precise type and size of header may be selected depending on a number of factors such as the crop that is to be harvested, the dimensions or other aspects of the field to be harvested and so on.

Further conveniently the apparatus may include one or more parameter input or detection devices that is capable of generating one or more signals indicative of the value of one or more variable parameters of or pertaining to the mobile harvesting machine. Hence the apparatus may be capable of automatically identifying (for example as a result of a "handshake" routine when the header is connected) e.g. the type or size of header fitted; or the header may include e.g. a bar code or QR code, that may be read by a reader fitted to the harvesting machine or using for instance a smartphone that is operatively connectable to the one or more processors, containing encoded information on such parameters; or the apparatus may include a human-operated input device by means of which an operator may input information such as header width data. The apparatus of the invention may then be arranged, e.g. through appropriate programming, to match the operation of residue spreading components to the parameter information that is input by way of the input device.

Notwithstanding the illustration of variable parameters of the harvesting machine in the form of header size information, such parameters are not limited in this way. A variety of parameters may be taken account of in ways similar to the foregoing.

It is not necessary moreover that the interface device produces a visible output. Additionally or alternatively therefore the interface device may generate outputs that are audible, vibratory, otherwise haptic or otherwise capable of being interpreted by a human operator. The interface may in embodiments influence an existing sub-system of the mobile vehicle. As a non-limiting example in this regard one may consider a haptic control device such as a motor-powered steering wheel in which the output of the interface device takes the form of a guiding force that is detectable by a human operator gripping the steering wheel and that encourages driving of the mobile harvesting machine in a direction that optimises residue deposition.

Notwithstanding the options for non-visual augmentation as described above, in embodiments the augmentation added to one or more said outputs optionally may be or may include one or more of: one or more lines overlain on a visual display; one or more symbols overlain on a visual display; one or more words overlain on a visual display; shading of part or all of a visual display; occlusion of part or all of a visual display; patterning or hatching of part or all of a visual display; brightening or intensifying of part or all of a visual display or colouring of part or all of a visual display. References herein to one or more lines being overlain on a visual display include the generation by the processor of one or more lines that are generated using the interface device so as to appear to be overlain on one or more images relating to the deposition of field residue. In particularly preferred embodiments the augmentation includes two or more lines overlain of the display. In such circumstances the lines may respectively represent left- and right-hand edges of a swath of deposited residue material, as further explained below.

Further consistently with the foregoing the one or more images may be or may include one or more of a video image, a mimic or simulation, an animation, a hybrid video-mimic/simulation, a hybrid video-animation, a hybrid mimic/simulation-animation or a static image.

Preferably when augmentation includes one or more lines overlain on a visual display the lines are such as to guide the deposition of residue resulting from control of the mobile harvesting machine by a human. As non-limiting examples in this regard the one or more lines may indicate one or more of: one or more edges, such as lateral edges, of an area and/or swath of deposited residue; one or more height/density (especially but not necessarily areal density) parameters of an area and/or swath of deposited residue; one or more cross-section of an area and/or swath of deposited residue; one or more field boundary; one or more boundary of a region of unharvested crop; one or more headland; one or more obstacle on the ground surface; one or more regions in which residue coverage is less or greater than desired; the strength and/or direction of prevailing wind; and/or the influence of a field slope on the deposition of residue. Such lines in some embodiments may be presented in combination with one or more messages, codes or numbers, for example as indicated above.

Conveniently the mobile harvesting machine may include one or more sources of motive power, one or more ground-engaging elements and one or more drive train elements whereby the mobile harvesting machine is capable of self-powered locomotion. However the invention is not limited to self-powered vehicles, and includes within its scope embodiments in which the mobile harvesting machine is powered by another machine, e.g. by reason of being towed behind another vehicle.

Preferably the agricultural residue depositing apparatus includes an operator's cab, and further preferably the interface device is within or supported by the operator's cab.

Notwithstanding this preference the interface device could be situated remotely from the harvesting machine that is performing the residue spreading operation. Hence it is possible for the interface device to exist e.g. in another vehicle, such as a tractor, to which the mobile harvesting machine is connected via a communications and/or control link; or for the interface device to be located in a fixed location such as at the edge of a field that is undergoing harvesting; or even in a remote location such as a farm office or data analysis centre. Furthermore it is within the scope of the disclosure hereof to provide more than one interface device, situated in different locations. The interface may exist as, or as part of, a so-called "app" installed on a mobile device such as a portable computer, smartphone or tablet device.

When provided the operator's cab may include one or more controls that are operatively connected to permit a human to modify one or more adjustable parameters of or relating to the deposition of residue based on one or more outputs of the interface device. Such parameters include but are not limited to those explained above, and in particular may be one or more selected from the list including the speed of ejection of residue from the mobile harvesting machine; the trajectory angle of ejection of the residue from the mobile harvesting machine; the height from which the residue is ejected from the mobile harvesting machine; the speed of the mobile harvesting machine; and the direction of travel of the mobile harvesting machine.

Further the mobile harvesting machine may include one or more adjustable cutter for comminuting the residue and the one or more controls optionally may permit varying of the degree of comminution of the residue by adjusting the cutter. Such varying typically would be based on the one or more outputs of the interface device.

The one or more sensors referred to above may include one or more sensors supported by the mobile harvesting machine; and/or by a further machine such as a vehicle. The further machine may be selected from the list including a mobile, ground-supported vehicle and/or an airborne vehicle. In some preferred embodiments the further vehicle may be an unmanned aerial vehicle (UAV) or "drone".

Combinations of different arrangements of mobile sensors may be employed. As a consequence it is possible for example for the sensors to comprise, say, a plurality of sensors mounted on a mobile vehicle and one or more sensors mounted on a UAV. A wide variety of sensor types and combinations will be considered by the person of skill in the art as lying within the scope of the disclosure hereof.

The disclosure hereof also extends to a method of depositing agricultural residue comprising steps of causing a mobile harvesting machine forming part of apparatus to move on a ground surface while depositing agricultural residue on the ground surface, the deposition being adjusted in accordance with control commands input to the mobile harvesting machine by a human based on comprehension of one or more outputs of the interface device by the human, and the one or more outputs being augmented in one or more human-interpretable ways based on one or more signals, of or relating to agricultural residue deposited by the mobile harvesting machine, generated by the one or more sensors.

Such a method is likely to enjoy good acceptance by operators of harvesting machines since when embodied in practical ways it combines a believable output modification of a realistic image, such as a camera image, a mimic or a simulation with the ability of an operator to effect commands that alter the residue spreading output. The commands give rise to alteration of the modifications of the image in proportion to the degree of change required by the operator. Overall therefore this method may be trusted better than full automation of the residue spreading parameter adjustment. However as explained herein the apparatus and method of the invention also are capable of operation in a fully automated manner.

To the latter end the disclosure hereof extends to a method of depositing agricultural residue comprising steps of causing a mobile harvesting machine to move on a ground surface while depositing agricultural residue on the ground surface, the deposition being adjusted in accordance with control commands generated by the one or more processors in dependence on one or more outputs of the one or more sensors of agricultural residue deposited or being deposited by the mobile harvesting machine, the one or more outputs of the interface device being augmented in one or more human-interpretable ways based on one or more signals, of or relating to agricultural residue deposited by the mobile harvesting machine, generated by the one or more sensors. Hence the human operator may in accordance with the disclosure monitor in an effective manner the operation of an automated control of residue deposition.

Preferably the method includes supporting one or more of the sensors of the agricultural residue spreading apparatus on the mobile harvesting machine and/or supporting one or more said sensors on a further vehicle that is moveable independently of the mobile harvesting machine.

Conveniently the interface device is or includes a visual display that is visible to a human operator and that displays one or more images of or relating to agricultural residue deposited by the mobile harvesting machine; and the method optionally includes augmenting the one or more outputs by including one or more lines overlain on the visual display; including one or more symbols overlain on the visual display; including one or more words overlain on the visual display; shading of part or all of the visual display; occlusion of part or all of the visual display; patterning or hatching of part or all of the visual display; brightening or intensifying of part or all of the visual display or colouring of part or all of the visual display. In preferred embodiments of the method the augmentation includes two or more lines, in like manner to the preferred two or more lines explained herein in connection with apparatus according to the invention.

In particularly preferred embodiments the one or more images is or includes one or more of a video image, a mimic/simulation, an animation, a hybrid video-mimic/simulation, a hybrid video-animation, a hybrid mimic/simulation-animation or a static image.

Conveniently when augmentation as aforesaid includes one or more lines overlain on the visual display the lines are such as to guide the deposition of residue resulting from control of the mobile vehicle by a human. Optionally the one or more lines when present indicate one or more of: one or more edges of an area and/or swath of deposited residue; one or more height parameters of an area and/or swath of deposited residue; one or more cross-section of an area and/or swath of deposited residue; one or more field boundary; one or more boundary of a region of unmown crop; one or more headland; and one or more obstacle on the ground surface; one or more regions in which residue coverage is less or greater than desired; the strength and/or direction of prevailing wind; and/or the influence of a field slope on the deposition of residue.

Preferably the method includes adjusting one or more parameters of deposition of residue in dependence on the control commands, the one or more parameters being or including one or more of the speed of ejection of residue from the mobile harvesting machine; the trajectory angle of ejection of the residue from the mobile harvesting machine; the height from which the residue is ejected from the mobile harvesting machine; the speed of the mobile harvesting machine; and the direction of travel of the mobile harvesting machine.

If the mobile harvesting machine includes one or more adjustable cutter for comminuting the residue the method preferably includes optional varying of the degree of comminution of the residue by adjusting the cutter. The degree of comminution can for example be adapted by changing the chopper speed, the number of knives inserted in the residue stream and the angle and/or degree of insertion of the knives.

The field residue spreader of a harvesting machine such as a combine harvester may take a variety of forms as exemplified in the documents summarised above. The disclosure hereof extends to mobile vehicles including all types of such spreaders as will occur to the person of skill in the art, and especially spreader designs in which left- and right-hand rotary impellers, that are adjustable as to the speed and angle of residue ejection, are included near the rear of a harvesting machine such as to be fed with residue particles from the crop processing path within the harvesting machine.

The method may include the step of carrying out at least first and second residue-spreading passes along a field or part of a field and in a said pass other than the first pass causing residue spreading so as to compensate, based on the augmentation of the one or more outputs, for deficient spreading of residue in the first pass. Further preferably the method may include operating an algorithm to determine one or more parameters of spreading so as to compensate for deficient spreading of residue in the first pass. Such an algorithm may be based for example on so-called "proportional-integral-differential" control methods, or other control methods as will occur to the person of skill in the art.

The disclosures hereof, and the invention, also extend to harvesting machines and the use thereof in which more than one residue system is present. In this regard it is known for some mobile harvesting machines, such as the New Holland CR Series machines, to include a spreading system for chopped straw and a further spreading system for other residue such as chaff. In one embodiment the apparatus disclosed herein may be operable to monitor chaff spreading and deposition in the ways described herein and a straw spreader may be separately operational to create swaths of straw.

BRIEF DESCRIPTION OF DRAWING FIGURES

There now follows a description of a preferred embodiment of the invention, by way of non-limiting example only, with reference being made to the accompanying drawings in which:

(FIG. 2) a form of spreading that may be regarded as sub-optimal by reason of incomplete coverage of residue on the ground surface of the field;

FIG. 8 shows one example of the output of an interface device in accordance with the disclosure hereof and in which under-spreading as shown in FIG. 7 is being corrected for;

FIG. 10 shows a further example of a residue spreading mode in which residue deposition onto a tractor moving near a harvesting machine is avoided and subsequently compensated for.

DETAILED DESCRIPTION OF THE INVENTION

In the following the terms "mobile vehicle" and "mobile harvesting machine" are used essentially synonymously.

Figure 1:
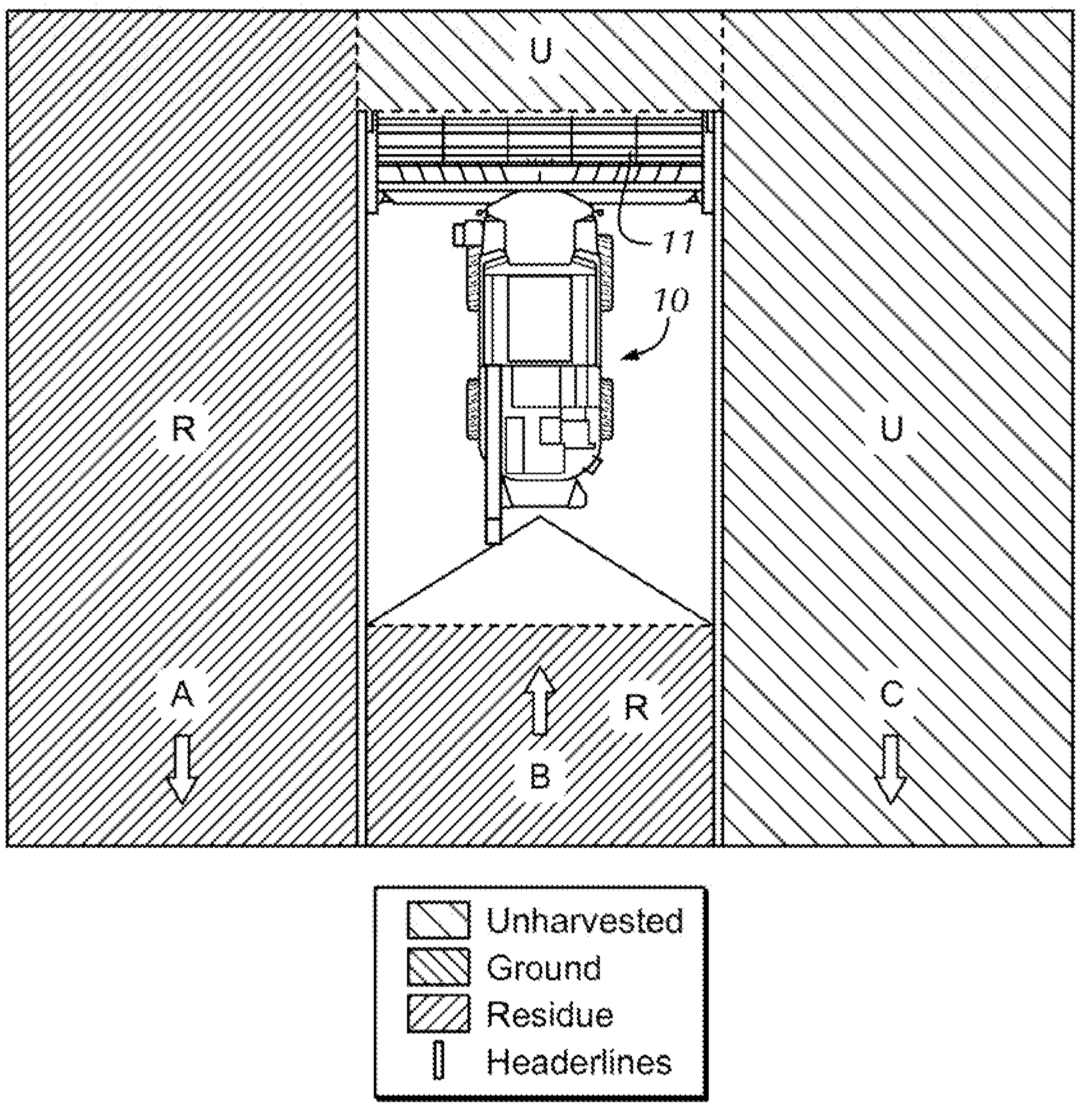
FIGS. 1 and 2 are schematic, plan views from above of a mobile harvesting machine in the form of a combine harvester moving in a field and illustrating (FIG. 1) one form of residue spreading that may be regarded as optimal.
Figure 2:
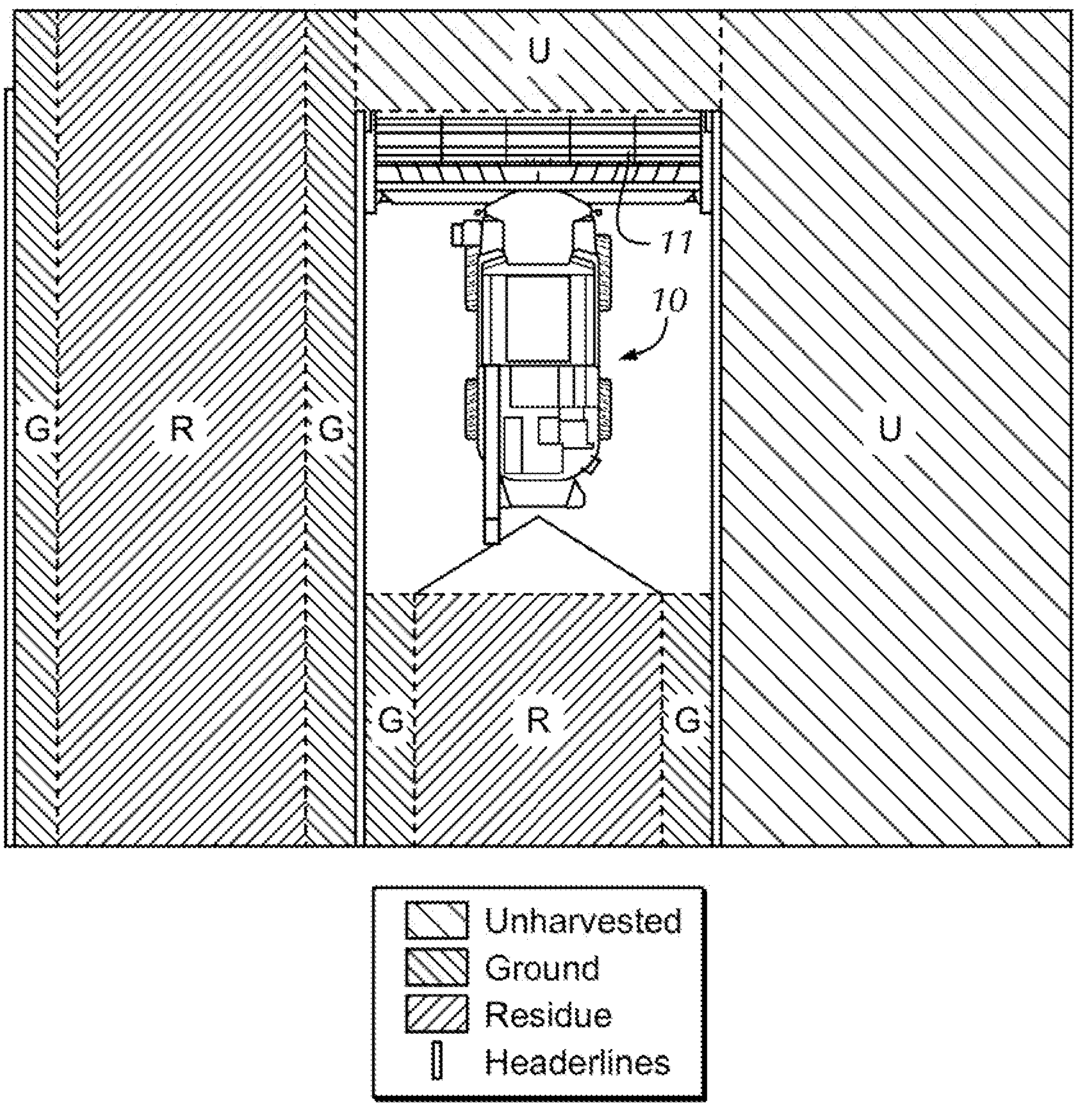

Referring to the drawings FIGS. 1 and 2 as noted are schematic plan views from above of agricultural residue depositing apparatus including a mobile vehicle in the form of a combine harvester 10. FIGS. 1 and 2 illustrate some of the problems that can arise during the spreading of field residue during harvesting operations.

The combine harvester 10 is illustrated in the process of harvesting a field (a small part of which is shown) and, as a consequence of harvesting operations, depositing field residue. The combine harvester 10 moves under power provided by per se known engine, driveline and ground-engaging element components in usually straight lines along a field (although non-straight lines, occasioned by field characteristics or chosen by an operator or control system, are not excluded). The field residue is deposited behind the combine harvester 10, as it travels, as a result of operation of a spreader that typically would adopt the dual-impeller design outlined above, or an alternative design.

In FIG. 1 the combine harvester 10 has completed a first pass in the direction A along the field and is in the process of completing a second pass in the opposite direction B. The deposited residue R is darkly shaded in FIG. 1 and occupies the full width and length of the first pass. The deposited residue also occupies the full width of the second pass behind the combine harvester 10. In front of the combine harvester 10 there is uncut crop U, which also occupies the area of a third pass of the combine harvester that is represented by arrow C and is harvested in the opposite direction to the second pass. For ease of viewing the uncut crop U is shaded more lightly than the residue R in FIG. 1.

As is known, by repeatedly passing along the field in alternating directions as described it is possible for the combine harvester 10 to harvest the entire field while leaving deposited residue on the field surface. Such alternating direction passes may not occur as adjacent passes, notwithstanding that this is often the situation. On the contrary, it is known for a combine harvester to complete alternating passes that are separated by a width corresponding to a further pass that is to be completed subsequently. Such a mode of using a combine harvester is of benefit for example when the field margin or headland does not permit the harvesting machine to turn tightly such that it can complete immediately adjacent, alternate-direction passes along the field. Also certain harvesting machine header dimensions may dictate that alternating passes along a field initially are separated by lengths of uncut crop (that may be cut in subsequent passes).

FIG. 1 shows what in many situations is optimal distribution of the residue R on the field. In FIG. 1 the line of deposited residue R is of essentially the same width as the header 11 of the combine harvester and hence covers practically the whole area harvested by the combine harvester 10. The deposited residue R does not extend beyond the boundary of the field and does not spread into areas of uncut crop U.

Such a situation arises when the settings of the spreader are appropriate for the ballistic and aerodynamic properties of the residue and/or the residue is processed in a manner that is suited to the spreader included in the combine harvester 10; and when there is no significant influence of wind or a field slope on the distribution of residue particles.

However in the prior art it is commonplace for the uniform residue distribution of FIG. 1 not to arise, and for distribution of field residue instead to be sub-optimal. One way in which this can be the case is illustrated in FIG. 2.

FIG. 2 is a similar schematic plan view from above to FIG. 1. In FIG. 2 the settings of the spreader of the combine harvester 10 are not correctly matched to the ballistic properties of the residue particles, and in particular the spreader does not impart enough energy to the lateral particle trajectories to give rise to complete coverage of the field (ground) surface. This can also happen when the combine harvester 10 faces wind in the direction along its travelling path, and in particular a headwind.

In other words the residue particles on ejection from the rear of the combine harvester 10 travel laterally (with respect to the combine harvester) so as only partly to cover the harvested area, in a central band as shown. This gives rise to lines of deposited residue R that are narrower than the width of the header 11, with exposed strips G of the ground at the margins of the deposited residue lines.

As may be inferred from the explanations above, this situation is associated with disadvantages. These potentially include excessive moisture evaporation from the exposed ground strips G, erosion of the soil of the exposed strips G, uneven distribution of nutrients as may pass from the residue to the soil of the field and exposure of plants germinating below ground level to adverse conditions that may be undesirable.

In practice a further form of defective covering by the residue of the field surface G may occur, in which lighter and/or less aerodynamic residue particles are thrown laterally from the spreader a lesser distance than heavier or more aerodynamic particles. This leads to differing concentrations of particle types when considering the lateral extent of the line of deposited residue, and/or heaping of the residue towards the centre of such a line. These situations also may be sub-optimal from the standpoint of the intended effects of the residue on agricultural operations.

Figure 3:
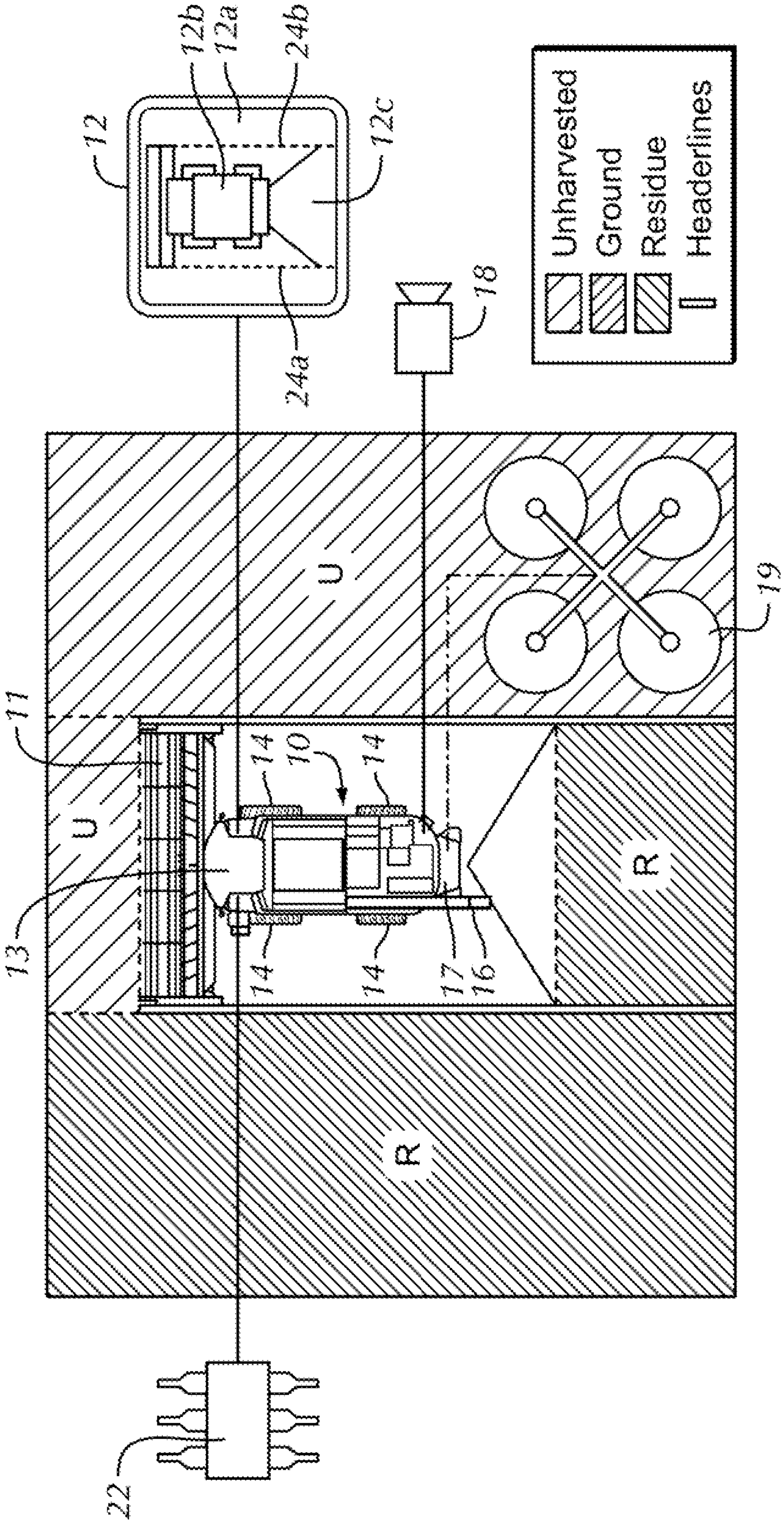
FIG. 3 shows agricultural residue depositing apparatus in accordance with an embodiment of the disclosure hereof.

FIG. 3 illustrates, in a similar schematic manner to FIGS. 1 and 2, agricultural residue depositing apparatus in accordance with an embodiment of the disclosure hereof.

FIG. 3 shows a human-controllable mobile vehicle that in the illustrated embodiment is constituted as a combine harvester 10, but that may take a range of other forms as explained herein.

As is commonplace in such vehicles the combine harvester 10 is capable of movement over the surface of a field for the purpose of harvesting crop growing in the field. To this end the combine harvester 10 includes various features and sub-systems such as a header and reel assembly 11, an operator's cab 13, an engine, transmission, drive train and ground-engaging wheels 14 or tracks; internal crop plant processing machinery; a discharge spout 16 for discharging processed crop into e.g. a trailer that is towed behind a tractor moving from time to time alongside the combine harvester 10; and a residue spreader 17 for spreading field residue behind the combine harvester 10 as it moves forwardly in the field in order to harvest crop plants. Not all of these features and sub-systems are visible in FIG. 3 but they all may readily be envisaged by the person of skill in the art.

The apparatus of FIG. 3 includes an interface device that in the illustrated embodiment takes the form of a display screen 12 but may take a range of other forms as explained herein. The display screen 12 is capable of generating an output that is interpretable by a human. This can take the form of a camera image, mimic or simulation of the movement of the combine harvester 10 and its activity in depositing field residue.

In FIG. 3 the output of the display screen 12 is a mimic or simulation 12*a* including an image 12*b* representing the combine harvester 10 and a visual indication 12*c* of the deposition of field residue at the rear of it. As explained however the output of the interface device may take a variety of alternative forms.

The display screen 12 in preferred embodiments is positioned in the cab 13 such that it is readily viewed by a human operator of the combine harvester 12 and is schematically illustrated as being hard-wired. The wiring connections of the display screen 12 may be such as to permit its repositioning within the cab, e.g. through the inclusion of a trailing or retractable data/signal cable. Alternatively the display screen 12 may be wirelessly connected.

It is not essential that the display screen 12 is positioned within the cab 13; and indeed in some embodiments the mobile vehicle forming part of the apparatus may be driverless and may omit an operator's cab. In other words the display screen or other interface device may be arranged to operate remotely of but operatively connected to the combine harvester 10 or other mobile vehicle forming part of the apparatus.

The output of the interface device is derived from operation of one or more sensors. In FIG. 3 two, of many possible, options for such sensors are shown in the form of a vehicle-mounted camera or other sensor 18 and a UAV 19 that includes sensing equipment.

The vehicle-mounted camera/sensor 18 is shown in FIG. 3 as being hard-wired as part of the illustrated apparatus and is in a preferred location at the rear of the combine harvester 10 such that its "line of sight" (this term referring to non-optical sensing arrangements as well as optical sensing devices and being interpreted accordingly) takes in the field residue that is in the process of being deposited behind the moving combine harvester 10. In other embodiments the one or more sensors may include one or more sensor such as camera 18 that is wirelessly connected. The camera/sensor can be mounted at any of a range of different heights at the rear of the combine harvester 10. It can for example be in a relatively high location, such as on top of the rear of the combine harvester 10, to permit viewing of the residue spreading from above; or it can be lower, such as at the same level or below the spreaders, to view the spreading at a lesser angle. It is moreover possible to devise embodiments in which the position of the camera/sensor is adjustable in order to change the view of the residue.

The camera/other sensor 18 operates to generate signals that are processed to create one or more images of the field residue while it is being deposited, or shortly after it has been deposited, behind the combine harvester 10. The images may be continuous video images, a series of still images or any of a range of other optical image types including images representing the degree of reflection or absorption of light. Further the camera 18 may be e.g. of a type that generates LIDAR signals or uses another laser-derived imaging technique; or it may be augmented or replaced by a device, such as an acoustic sensor, that operates in accordance with physical principals other than optical ones. Laser and non-optical sensor types, in particular radar, may be of particular benefit in avoiding the effects of the harvesting dust cloud as explained above.

Regardless of its precise type the sensor can comprise a 2D sensor array, or a 1D array sensor or a single point sensor having a scanning movement ability that can record a 2D image. The information recorded by the sensor can be combined with other information, in particular the sensor height and viewing angle, to reconstruct a usable view of the field residue on the field, for example a view from above or an isometric or perspective view that is easily understandable by the operator. Well-known image processing techniques such as but not limited to edge thresholding, curve fitting, signal filtering and peak energy detection can be used to improve the image quality, in particular to reduce noise and/or effects of ambient (light) conditions.

One non-limiting example of a sensor that could be employed in apparatus according to the invention is disclosed in EP 3145289 A, mentioned above, the disclosure of which is incorporated in its entirety herein.

As indicated in addition or as an alternative to a vehicle-mounted sensor such as camera 18 the apparatus of the invention may include one or more sensors that are mounted on or supported by one or more further vehicles. One exemplary embodiment of such a vehicle is shown in FIG. 3 in the form of a UAV 19. This may support any of the sensor types described above and may be wirelessly connected, using any of a range of protocols, to the one or more processor 22. This is signified schematically in FIG. 3 through the use of a dotted line connecting the UAV 19 to the combine harvester 10.

Instead of being supported by a UAV a remote, moveable sensor may be supported by another ground-based vehicle such as a tractor or other farming support vehicle When the one or more sensors are constituted as or include optical cameras as described, it is not essential that they are stimulated in visible light wavelengths in order to produce the outputs described herein. On the contrary it is for example possible for the camera(s) to be infra-red cameras or other camera types that do not rely for operation on visible light wavelengths.

The images generated from the signals generated by the one or more sensors may be processed in real-time (or near-real-time) or with a delay, depending on the processing options adopted, and may include e.g. filtering to remove light wavelengths or other signal noise e.g. associated with the dust generated at the rear of a combine harvester during harvesting in dry conditions, filtering to remove excessive sunlight wavelengths that might otherwise overwhelm the generated signal(s) or cause confusing reflections, and other filtering options. To such ends the apparatus includes at least one processor that in FIG. 3 is represented schematically by reference numeral 22 and may be located within the combine harvester. The processor 22 is operatively connected, e.g. by being either hard wired or wirelessly connected, to both the one or more sensors and the output device (display screen 12 in the illustrated embodiment).

In other embodiments the processor 22 may be positioned remotely of the combine harvester 10 e.g. in another vehicle or in a farm office or data centre, or in the "cloud"; and may in such a case be wirelessly connected to process the signals generated by the one or more sensors and generate the one or more images via the output device as referred to above.

More than one processor 22 may be provided as required; and combinations of processors mounted in or on the mobile vehicle and remotely thereof are within the scope of the disclosure.

Regardless of the precise sensor and processor combination adopted the described arrangement gives rise during harvesting to the generation of one or more outputs of the output device (display screen 12) in the form of one or more images of the residue as it is being deposited (e.g. while it is in flight) or shortly after being deposited on the ground. The processor 22 adds human-interpretable augmentation to the one or more images that assists a human operator to optimise the deposition of residue according to one or more criteria including but not limited to those variously described herein.

Figure 4:
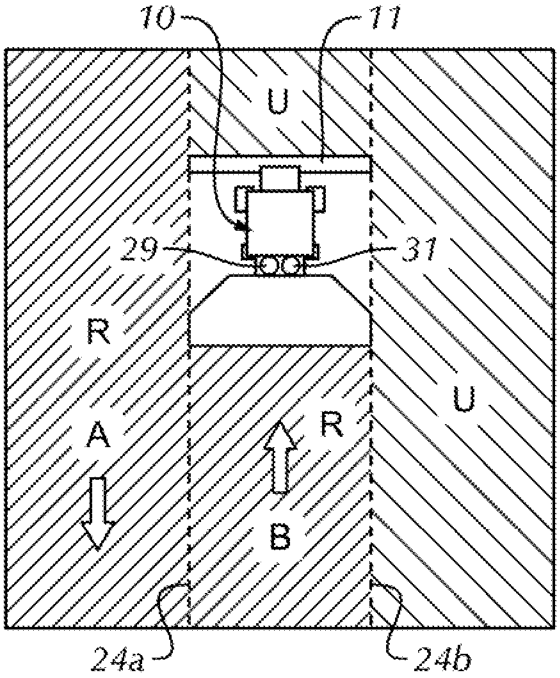
FIG. 4 shows in schematic form an exemplary output of an interface device that is augmented in accordance with a first, relatively simple, residue deposition method using agricultural residue spreading apparatus in accordance with the disclosure hereof and in accordance with a method also in accordance with the disclosure hereof.

Referring now to FIG. 4 an exemplary display output of the interface device is shown, and includes a simple form of augmentation, as mentioned herein, in the form of respective residue deposit boundary lines 24*a*, 24*b*. FIG. 4 schematically shows one form of output of the interface device (display screen 12) in the form of a mimic or simulation of the combine harvester 10, the desired distribution of field residue R and the location of unharvested crop U.

The boundary lines 24*a*, 24*b* are in FIG. 4 overlain on an image of the deposited residue generated using the display screen 12. The operator of the combine harvester 10 in response to such augmentation may adjust or, as necessary, maintain, one or more settings of the combine harvester with the aim of ensuring that the line image 12*c* representing the deposition of residue behind the combine harvester 10 is optimised in accordance with a chosen optimisation strategy.

The lateral separation of the lines 24*a*, 24*b* in FIG. 4 is the same as the width of the header 11 of the combine harvester 10. The FIG. 4 deposition optimisation strategy for this reason may be referred to as a "match header width" mode. In this strategy the aim is to ensure full coverage of the ground with deposited residue R as harvesting takes place, while avoiding contamination of unharvested crop U.

The adjustable settings as explained may include the speed and/or direction of the combine harvester 10, the angle at which the spreader distributes residue, the energy imparted by the spreader to the residue and the setting of a cutter that chops the residue particles to a predetermined size. The combine harvester 10 includes one or more controls that are not shown in the drawings but that may readily be envisaged for such purposes. Typically the one or more controls would be located within the operator's cab 13 although it is possible for such controls additionally or alternatively to be located elsewhere on the mobile vehicle, such as for example as part of an externally mounted control panel.

It is also possible for the one or more controls to be located remotely of the mobile vehicle and wirelessly connected to provide for the indicated settings adjustments. Examples of how to achieve this are described herein. Yet a further possibility is for the one or more controls to be part of a control panel that is connected or connectable to the mobile vehicle by way of an umbilical cable that allows for command and/or data transfer.

The controls may be of hardware types such as levers, foot pedals, wheels, knobs, other rotary controls, keypad/keyboard keys, sliders and switches; or they may be of software types such as features visible on a touchscreen or similar input device. Such a touchscreen may be or may form part of the display screen 12 or it may be separate therefrom. Combinations of hardware and software controls may be provided, in ways that will occur to those of skill in the art. Also, as noted, the optimisation may be implemented automatically with the augmentation features serving as confirmation for an operator of the operational mode adjustments rather than as prompts to encourage adjustments by the operator of the vehicle settings.

As explained FIG. 4 shows a basic form of augmentation of the image of display screen 12 with simple yet human-interpretable lines intended to guide the deposition of field residue overlain on the residue image. More complex and/or sophisticated augmentation may include, as mentioned, one or more symbols overlain on the visual display; one or more words overlain on the visual display; shading of part or all of the visual display; occlusion of part or all of the visual display; patterning of part or all of the visual display; brightening or intensifying of part or all of the visual display or colouring of part or all of the visual display all in ways that are meaningful to a human operator and will guide the process of residue deposition in an optimal manner.

Figure 5:
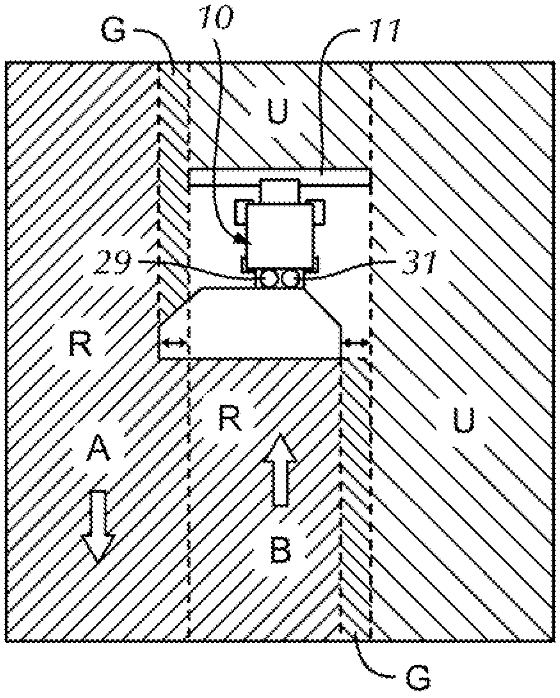
FIG. 5 is a similar view to FIG. 4 and shows a modified mode of residue spreading in which the spread residue is laterally offset in order to avoid contamination of unharvested crop.
Figure 6:
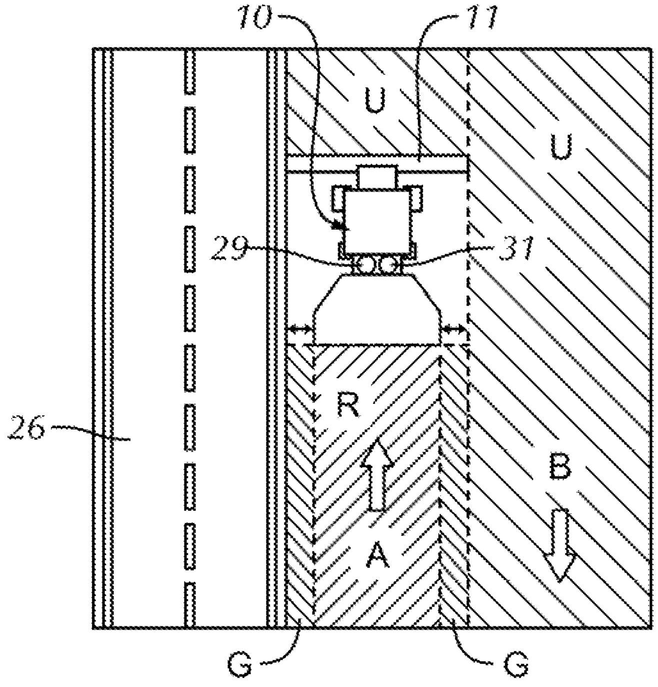
FIG. 6 is a similar view to FIG. 5 and shows a modified mode of residue spreading in accordance with the disclosure hereof and in which the spread residue is laterally offset in order to avoid both contamination of unharvested crop and spreading of residue beyond a field boundary as exemplified by a roadway.
Figure 7:
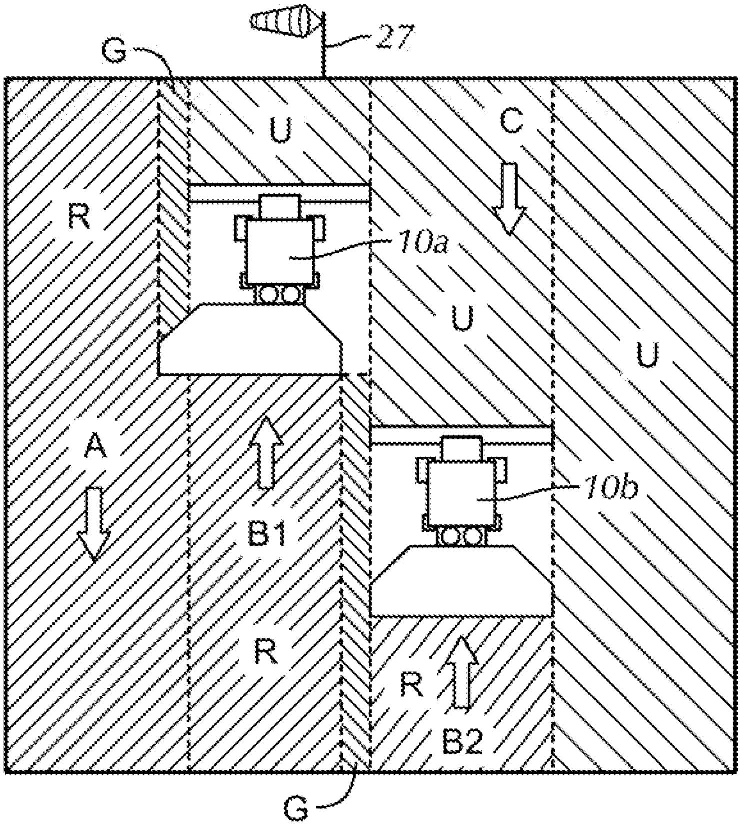
FIG. 7 shows in plan view a further operational residue spreading mode in accordance with the disclosure hereof and in which wind-caused under-spreading of residue in a first harvesting/spreading pass is compensated for in a second pass which may be undertaken by a second mobile harvesting machine or by one and the same mobile harvesting machine performing successive passes.

It is possible to effect such optimising in accordance with the full coverage example in FIG. 1, or in accordance with other optimisation strategies; and some non-limiting further options of optimisation strategies are presented in FIGS. 5, 6 and 7.

The residue distribution optimisation shown in FIG. 5 is a form of lateral offsetting strategy. In this the distribution of residue R is, as a result of settings implemented in a similar manner to that described above in response to augmentation added to the output of the interface device, laterally offset to one side (in the illustrated embodiment to the left, but it equally well could be to the right) relative to the longitudinal centre line of the harvesting rows, and therefore also the longitudinal centre line of the combine harvester 10.

This optimisation approach has the advantage of providing strips of the ground surface G to the right of the combine harvester 10 during each pass onto which no residue is deposited. This in turn means that there is no risk of contamination of the unharvested crop U constituting yet to be harvested rows by the field residue. This mode of operation may be of particular benefit if the residue might choke the crop intake parts of the combine harvester 10 and/or overload the internal machinery, and in particular the threshing and/or cleaning sections, of the harvester 10 if it was mingled with the unharvested crop U during a harvesting pass.

The apparatus and methods described herein permit a subsequent pass of the combine harvester 10 (Pass B in FIG. 5) completed in accordance with the same lateral offsetting optimisation strategy as a previous pass (Pass A), but in the opposite direction thereto, to cause covering with deposited field residue R of the edge strips G of the ground surface that are (in the illustrated embodiment) left uncovered on the right hand side of the combine harvester 10. Hence by the time the combine harvester 10 has completed several passes, all but at most a single strip of uncovered ground (resulting from the last pass along the field) would receive a layer of deposited field residue R.

FIG. 6 shows a variant on the FIG. 5 strategy that may be termed a "double offset" method of operating the apparatus disclosed herein. In FIG. 6 the deposited residue R is confined, as a result of the settings implemented by the operator of the combine harvester 10 in response to augmentation added to the output device; or as a result of automated operation as explained, to a central strip behind the combine harvester 10 that is narrower than the width of the header 11. This results in two strips of uncovered ground G to either side of the central strip of deposited residue.

Such a strategy may be of benefit when there is to either side of the combine harvester 10 a feature or zone that it is desired to maintain free of deposited residue. In FIG. 6 these are exemplified by a roadway 26 to the left of the combine harvester 10; and a region of uncut crop U to the right. However as will be apparent from the disclosure hereof the strategy of offsetting the deposition of field residue R on both sides of the combine harvester 10 could be for a range of reasons other than those represented in FIG. 6.

Adoption of the FIG. 6 approach to residue deposition in the illustrated situation need occur for only a first pass (in direction A), since only during this pass is it desirable to avoid residue deposition up to the edge of the pass on both sides of the combine harvester 10. Once Pass A is completed therefore the apparatus may switch (or be switched through control actions effected by the operator) to e.g. the mode of FIG. 5, in which offsetting only to one side occurs, during subsequent harvesting activity.

It is not necessary for a single optimisation mode to be adopted for the whole of each pass along the field. Hence if (using the example of FIG. 6) the roadway 26 extends close to the field only for part of the length of Pass A it would not be necessary to adopt the double offset optimisation method for the whole of that pass. Instead the operational mode could be switched to that of FIG. 5, or another mode, part-way along Pass A.

In like manner to the FIG. 5 optimisation that illustrated in FIG. 6 also could be implemented through automated responding of the mobile harvesting machine to the sensor outputs (or derivatives or parts thereof), with the visual augmentation serving primarily a confirmatory purpose.

FIG. 7 shows another way in which sub-optimal deposition of field residue may arise. In FIG. 7 undesired lateral offsetting of the deposition of residue may occur because of a weather phenomenon such as a cross-wind and/or a geographical feature such as a field slope. Such influences are represented schematically in FIG. 7 by wind sock 27. They can result in uncontrolled under-coverage of deposited field residue R leaving strips G of uncovered ground the boundaries of which vary as illustrated along the respective passes of the combine harvester 10 along the field.

The optimisation mode to be adopted in accordance with the disclosure hereof in such a situation may include augmenting the output of an interface device in a manner encouraging the deposition of field residue during subsequent passes that compensates for incomplete coverage in previous passes.

In FIG. 7 a first combine harvester 10*a* has completed an initial pass (Pass A) in which the described incomplete coverage has occurred, and is in the process of compensating for this during a second pass (Pass B1) along the field with the settings of the combine harvester 10*a* ensuring that the coverage of residue is complete in the area harvested during Pass A.

As is shown in FIG. 7 this results in a further strip of incomplete coverage G to the right of the residue coverage caused by Pass B1. This in turn may be compensated for through use of a second combine harvester 10*b* completing a third pass (Pass B2) in the same direction as and slightly behind combine harvester 10*a* when completing Pass B1.

In order for a second combine harvester 10*b* to proceed as explained it is necessary for the residue deposition information acquired by the first combine harvester 10*a* to be shared with the second combine harvester 10*b*. This can be achieved through the first and second combine harvesters 10*a*, 10*b* being capable of mutual (wireless) communication; or though storing of the information acquired by the first combine harvester 10*a* in a "cloud" or other commonly (to the respective harvesting machines 10*a*, 10*b*) accessible store from where it can be accessed by the second combine harvester 10*b*.

More generally, embodiments as disclosed herein are highly likely to be capable of storing information derived from the outputs of the one or more sensors. This can be for example through the use of on-board memory forming part of the combine harvester 10; or remote memory forms such as but not limited to flash memory devices, remote or disconnectable computing devices such as smartphones, laptop computers or tablet devices; or through use of cloud-based memory as indicated.

The presence of such memory facilities allows among other things the building-up of a map of residue deposition in a chosen field. This may be useful in a number of ways, one of which is to provide information some time after harvesting has been completed on the amount and distribution of spread residue in the field.

If a second combine harvester is not present the combine harvester 10*a* may instead complete a third pass (Pass C) in the opposite direction to Pass B1 in order to compensate for the incomplete residue coverage. During Pass C (if it is undertaken) the output of the interface device would be augmented in a way encouraging adjustment of the settings of the combine harvester 10*a* such that offsetting of the deposited field residue would occur to the opposite side of the centre line of the pass and the combine harvester to that of Pass B1 (i.e. to the right of the combine harvester in the example described) since otherwise the incompletely covered ground G would not receive a layer of residue R.

As mentioned, although in some modes of operation the various passes of the combine harvester(s) 10 may extend directly adjacent one another, it is also possible for one or more un-harvested strips of regions (that typically would be of the width of a harvesting pass, although this need not necessarily be the case) to be left, at least initially, with such strips or regions being subsequently harvested as explained herein. As will be apparent to the person of skill in the art, numerous combinations of pass locations, directions and timings are possible and it is not essential that the combine harvester(s) 10 work from one side of a filed to the other without variations in the harvesting (And residue depositing) regime.

Figure 8:
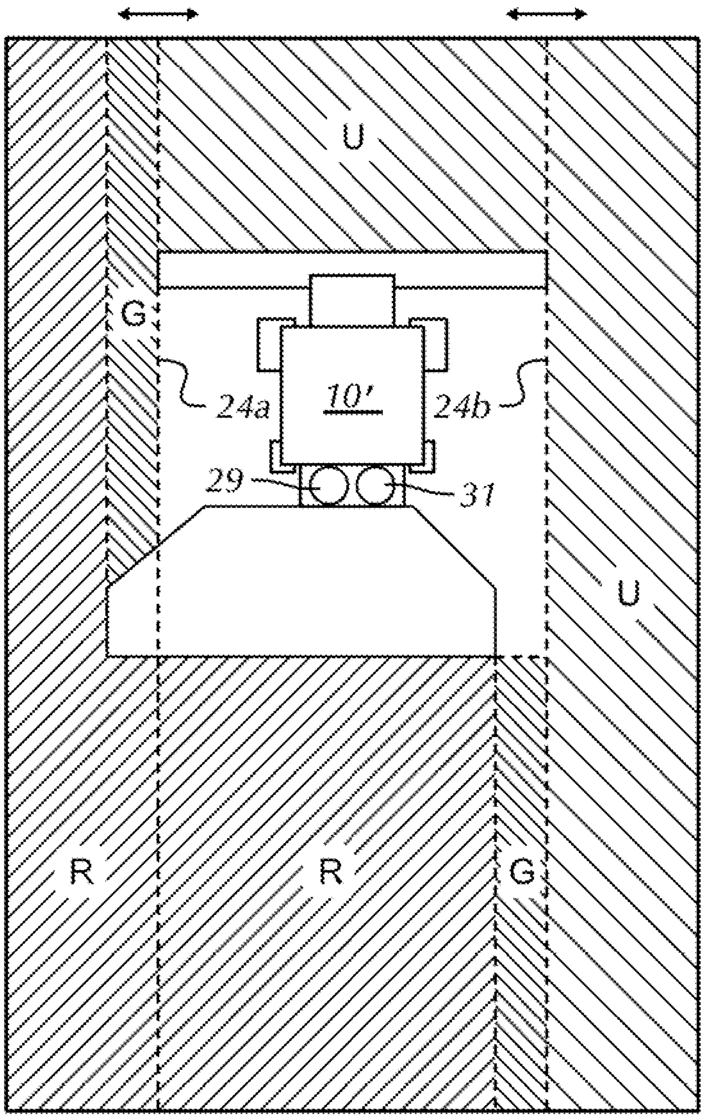

The output of an interface device such as display screen 12 during the operational mode exemplified in FIG. 7 is shown in FIG. 8. The output consists essentially of a mimic or simulation 10' of the combine harvester 10*a* together with augmentation of the output by way of residue deposition boundary target lines 24*a*, 24*b*. These are similar to the lines 24*a*, 24*b* of FIG. 4 and as indicated by arrows may move laterally in response to the detected residue coverage R. The operator of the combine harvester 10*a* may respond to the movement of the boundary lines 24*a*, 24*b* by adjusting one or more settings in order to ensure coverage of residue in the incompletely covered strip G that results from the influence of the wind and/or slope as described.

Additionally or alternatively, as indicated herein, the combine harvester(s) 10 may respond to the outputs of the sensor(s) in an automated mode, in which adjustments of the various parameters of residue spreading occur automatically in accordance with one or more control algorithms. In such a case the primary purpose of the display screen 12 may be to provide confirmation to the operator of the harvesting machine that residue spreading is occurring in a desired or optimal manner.

Switching between automated and manually controlled modes of operation may be provided for, and the combine harvester may include one or more controls (that may be physical controls or may exist in software e.g. as touch screen icons) for this purpose.

Any of the modes of operation described herein may include augmentation that is variable for example in the manner of lateral offsetting of the boundary line positions as explained above. Any literary or numerical augmentation of the output of the interface device may also be variable, with updates of the augmentation occurring in dependence on the output signals of the one or more sensors that detect the deposition of residue on the ground.

Figure 9:
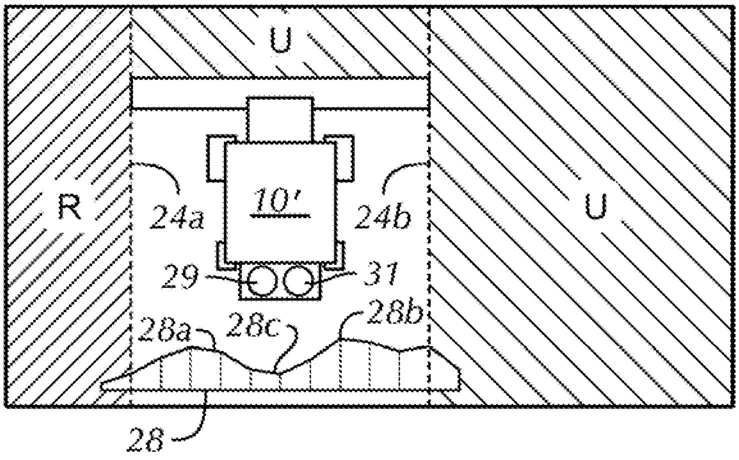
FIG. 9 shows another example of such an output including a residue spreading line profile simulation.

Another form of output of the interface device forming part of the disclosed apparatus is shown in FIG. 9. In this figure the output image includes a histogram-style display element 28, in addition to the display features such as those shown in FIG. 8, indicating the transverse cross-section of the deposited residue. This cross-section may alter over time as the combine harvester 10 moves along the field and the coverage of the residue varies.

Although in many situations even coverage of residue on the ground may be desired, equally it may be desirable for the cross-section of the deposited residue not to be constant from one side of the deposited residue area to the other. An example of this is shown in FIG. 9, in which two laterally offset residue height peaks 28*a*, 28*b* are separated from one another in the lateral direction by a central region 28*c* in which the depth of residue coverage is less than at the peaks. The method of operating the apparatus described herein may include adjusting the settings of one or more settable parts of the apparatus in order to achieve, or more typically prevent as being sub-optimal, this and/or alternative coverage depth variation effects.

FIGS. 8 and 9 clearly show in the simulation 10' of the combine harvester 10 the presence of left and right residue impellers 29, 31. The simulation (interface device output) may include e.g. displays of information concerning the operation and settings of these. For instance the simulation may include information on the respective rotational speeds of the impellers and/or the angles at which residue is ejected from them, these being settable parameters that influence the coverage of residue on the ground. The output may include target values for such parameters that are consistent with a particular optimisation strategy such as but not limited to those described herein.

Figure 10:
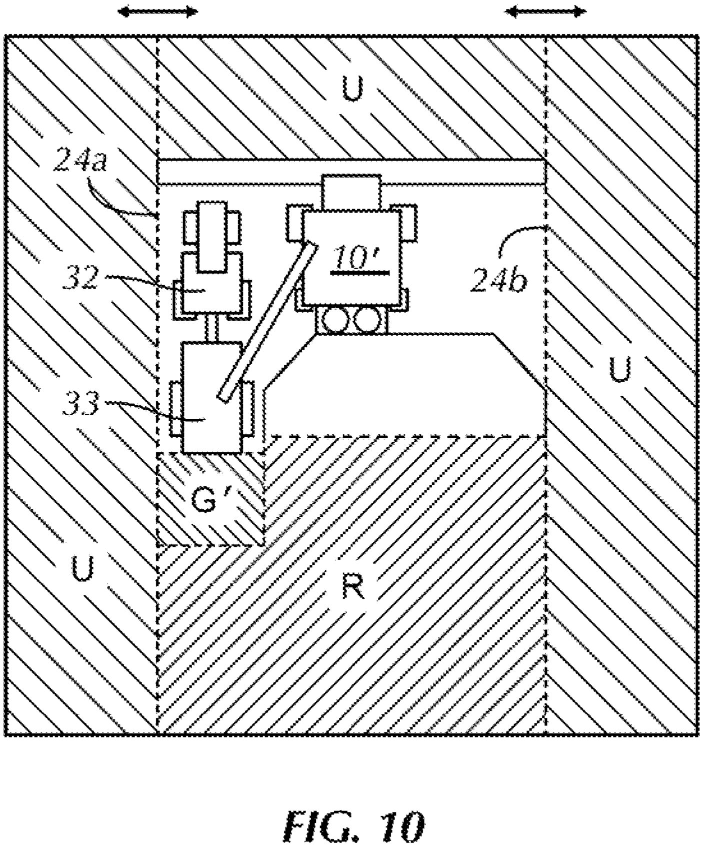

A further optional aspect of the method of the invention is illustrated in FIG. 10. In this figure the output of the interface device may include objects such as a tractor 32 that is moving in the field alongside the combine harvester 10 and tows a trailer 33. The augmentation of the output of the interface device can be such as to guide the operator of the combine harvester e.g. so as to avoid distributing residue onto the tractor 32 and trailer 33, or to take account of the influence of the tractor 32 and trailer 33 on the distribution of residue. As indicated by arrows in FIG. 10 and as in the embodiments described above the augmentation may be variable in a wide variety of ways in order to convey desired target residue coverage information.

The operational method of FIG. 10 may result in a strip G' of uncovered ground, but this is likely to be relatively short because the tractor typically during harvesting activity would travel alongside the combine harvester only for long enough for the content of the grain tank of the combine harvester to empty into the trailer 33. The uncovered ground surface G' can if desired be covered with residue as a result of a compensation method, that is similar to that shown in FIGS. 7 and 8, during a subsequent pass of the combine harvester 10 along the field.

Overall as explained the apparatus and methods described herein provide for a dependable way of ensuring desired residue deposition results, optionally in a manner that improves confidence in automated systems that may be provided. The apparatus and methods may give rise to the generation of simulations that, as a result of the sensors employed and/or the filtering of their output signals, avoids the visual inspection problems extant in the prior art, especially when harvesting activity takes place in dusty field conditions.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

What is claimed is:

1. An agricultural residue depositing apparatus comprising:

a mobile harvesting machine generating agricultural residue and depositing it on a ground surface over which the mobile harvesting machine moves;

one or more sensors sensing the agricultural residue deposited by the mobile harvesting machine; and one or more processors operably connected to the one or more sensors, the one or more processors additionally being operatively connected to the interface device in which the interface device generates one or more images based on one or more signals generated by the one or more sensors relating to the agricultural residue deposited by the mobile harvesting machine;

wherein the one or more processors add user interpretable augmentation to one or more of the images indicating one or more parameters relating to the agricultural residue deposited, wherein the interface device comprises a visual display visible to a user operator and that displays the one or more images relating to the agricultural residue deposited by the mobile harvesting machine, wherein the augmentation added to one or more of the images comprises lines overlain on the visual display, wherein the lines comprise target boundary-indicating lines indicating boundaries of an area and/or swath of the agricultural residue to be deposited, cross-section lines indicating a cross-section of the area and/or swath of the agricultural residue that was deposited between the target boundary-indicating lines, and one or more height lines indicating height parameters of the area and/or swath of the agricultural residue that was deposited between the target boundary-indicating lines.

2. The agricultural residue depositing apparatus according to claim 1, wherein the one or more images comprises one or more images representing the mobile harvesting machine, the one or more images being variable in dependence on one or more variable parameters pertaining to the mobile harvesting machine.

3. The agricultural residue depositing apparatus according to claim 2, further comprising one or more parameter input devices generating one or more signals indicative of a value of one or more variable parameters pertaining to the mobile harvesting machine.

4. The agricultural residue depositing apparatus according to claim 1, wherein the augmentation added to one or more of the images further comprises one or more of: one or more symbols overlain on the visual display; one or more words overlain on the visual display; shading of part or all of the visual display; occlusion of part or all of the visual display; patterning of part or all of the visual display; brightening or intensifying of part or all of the visual display; and colouring of part or all of the visual display.

5. The agricultural residue depositing apparatus according to claim 1, wherein the lines guide the deposition of the agricultural residue resulting from control of the mobile harvesting machine by the user operator.

6. The agricultural residue depositing apparatus according to claim 5, wherein the lines guide the deposition of the agricultural residue resulting from control of the mobile harvesting machine by the user operator, wherein the one or more lines further indicate one or more of: one or more field boundary; one or more boundary of a region of unmown crop; one or more headland; one or more obstacle on the ground surface; one or more regions in which residue coverage is less or greater than desired; the strength and/or direction of prevailing wind; and the influence of a field slope on the deposition of the agricultural residue.

7. The agricultural residue depositing apparatus according to claim 5, wherein the one or more lines further indicate one or more regions in which residue coverage is less or greater than desired.

8. The agricultural residue depositing apparatus according to claim 1, the apparatus further including a user operator's cab, wherein the interface device is within or supported by the operator's cab; and wherein the user operator's cab comprises one or more controls being operatively connected that enables the user operator to modify one or more adjustable parameters relating to the deposition of the agricultural residue based on one or more of the images of the interface device.

9. The agricultural residue depositing apparatus according to claim 8, wherein the one or more adjustable parameters relating to the deposition of the agricultural residue comprises one or more of the speed of ejection of the agricultural residue from the mobile harvesting machine; the trajectory angle of ejection of the agricultural residue from the mobile harvesting machine; the height from which the agricultural residue is ejected from the mobile harvesting machine; the speed of the mobile harvesting machine; and a direction of travel of the mobile harvesting machine.

10. The agricultural residue depositing apparatus according to claim 8, wherein the mobile harvesting machine comprises one or more adjustable cutters for comminuting the agricultural residue and wherein the one or more controls permits varying of the degree of comminution of the agricultural residue by adjusting the one or more adjustable cutters.

11. The agricultural residue depositing apparatus according to claim 1, wherein the one or more sensors comprises one or more sensors supported by the mobile harvesting machine and/or one or more sensors supported by a further machine.

12. The agricultural residue depositing apparatus according to claim 1, wherein the one or more processors filter the one or more of the images to remove sunlight wavelengths and/or signal noise associated with dust generated by the mobile harvesting machine.

13. An agricultural residue depositing apparatus comprising:

a mobile harvesting machine generating agricultural residue and depositing the agricultural residue on a ground surface over which the mobile harvesting machine moves;

one or more sensors sensing agricultural residue deposited by the mobile harvesting machine; and one or more processors to which the one or more sensors are operatively connected, the one or more processors additionally being operatively connected to an interface device comprising a visual display being visible to a user operator such that the interface device generates one or more images based on one or more signals generated by the one or more sensors relating to the agricultural residue deposited by the mobile harvesting machine, wherein the one or more processors add user-interpretable augmentation to one or more of the images indicating one or more parameters relating to the deposition of the agricultural residue, wherein the user-interpretable augmentation added to one or more of the images comprises lines overlain on the images, wherein the lines comprise target boundary-indicating lines indicating boundaries of an area and/or swath of the agricultural residue to be deposited, cross-section lines indicating a cross-section of the area and/or swath of the agricultural residue that was deposited between the target boundary-indicating lines, and one or more height lines indicating height parameters of the area and/or swath of the agricultural residue that was deposited between the target boundary-indicating lines, and wherein the one or more height parameters of the area and/or swath of the deposited residue between the target boundary-indicating lines are displayed in the form of a graphical representation comprising a histogram displayed between the target boundary-indicating lines.

14. A method of depositing agricultural residue, the method being executed by one or more processors, the method comprising:

instructing a mobile harvesting machine to move on a ground surface while depositing agricultural residue on the ground surface;

sensing the agricultural residue deposited by the mobile harvesting machine;

generating one or more images for a user operator based on signals derived from the sensing;

displaying the one or more images with user-interpretable augmentation to the user operator; and adjusting the movement of the mobile harvesting machine in the depositing the agricultural residue based on a deposition optimisation strategy comprising a match header width mode, wherein the adjusting is executed based on a review of the displayed one or more images by the user operator and with control commands implemented by the one or more processors;

wherein the user-interpretable augmentation comprises lines overlain on the images, wherein the lines comprise target boundary-indicating lines indicating boundaries of an area and/or swath of the agricultural residue to be deposited, cross-section lines indicating a cross-section of the area and/or swath of the agricultural residue that was deposited between the target boundary-indicating lines, and one or more height lines indicating height parameters of the area and/or swath of the agricultural residue that was deposited between the target boundary-indicating lines.

15. The method according to claim 14, including supporting one or more of the sensors on the mobile harvesting machine and/or on an additional vehicle that is moveable independently of the mobile harvesting machine.

16. The method according to claim 14, the method further comprises augmenting the one or more images by:

including one or more symbols overlain on the visual display;

including one or more words overlain on the visual display;

shading of part or all of the visual display;

occlusion of part or all of the visual display;

patterning of part or all of the visual display;

brightening or intensifying of part or all of the visual display; or colouring of part or all of the visual display.

17. The method according to claim 14, wherein the method further comprises using the lines to guide the deposition of the agricultural residue resulting from control of the mobile harvesting machine by user operator, wherein the one or more lines further indicate one or more of: one or more field boundary; one or more boundary of a region of unharvested crop; one or more headland; one or more obstacles on the ground surface; one or more regions in which residue coverage is less or greater than desired; a strength and/or direction of prevailing wind; and an influence of a field slope on the deposition of residue.

18. The method according to claim 14 further comprising adjusting one or more parameters of deposition of residue in dependence on the control commands, the one or more parameters being or including one or more of a speed of ejection of residue from the mobile harvesting machine; a trajectory angle of ejection of the residue from the mobile harvesting machine; a height from which the residue is ejected from the mobile harvesting machine; a speed of the mobile harvesting machine; and a direction of travel of the mobile harvesting machine.

19. The method according to claim 14, wherein the mobile harvesting machine comprises one or more adjustable cutters for comminuting the residue, and wherein the method comprises varying of a degree of comminution of the residue by adjusting the cutter.

20. The method according to claim 14 further comprising the step of carrying out at least first and second residue-spreading passes along a field or part of a field and, in a pass other than the first pass, causing residue spreading that compensates, based on the augmentation of the one or more images, for deficient spreading of residue in the first pass.

21. The method according to claim 20 further comprising operating an algorithm to determine one or more parameters of spreading that compensates for deficient spreading of residue in the first pass.

22. The method according to claim 14, further comprising adjusting two parameters of deposition of residue in dependence on the control commands, the two parameters being or including a speed of ejection of residue from the mobile harvesting machine and a trajectory angle of ejection of the residue from the mobile harvesting machine.

* * * * *